T. F. CHRISTENSEN.
AUTOMOBILE FROG.
APPLICATION FILED MAY 7, 1921.

1,405,567. Patented Feb. 7, 1922.

Inventor
T. F. Christensen.

By
Watson E. Coleman
Attorney

UNITED STATES PATENT OFFICE.

THORVALD F. CHRISTENSEN, OF CHICAGO, ILLINOIS.

AUTOMOBILE FROG.

1,405,567.  Specification of Letters Patent.  Patented Feb. 7, 1922.

Application filed May 7, 1921. Serial No. 467,524.

*To all whom it may concern:*

Be it known that I, THORVALD F. CHRISTENSEN, a citizen of the United States, residing at Chicago, in the county of Cook and State of Illinois, have invented certain new and useful Improvements in Automobile Frogs, of which the following is a specification, reference being had to the accompanying drawings.

This invention relates to automobile frogs, and has for its object to provide a device of this character capable of facilitating the use of the jack by eliminating the task of operating the jack until the axle or wheel is raised to the desired point.

It is another object of the invention to provide a device of this character which may be placed in position, and wherein the automobile is caused to substantially raise itself by coming in contact with the frog so as to permit the application of the jack to maintain the vehicle in the desired position.

It is also an object of the invention to provide a device of this character which can be readily disengaged from the vehicle after the jack is applied, by swinging the intermediate support toward the base of the frog so as to permit the remaining parts of the frog to collapse.

With these and other objects in view the invention consists in the improved construction and arrangement of parts to be hereinafter more particularly described, fully claimed, and illustrated in the accompanying drawings in which:

Figure 1:
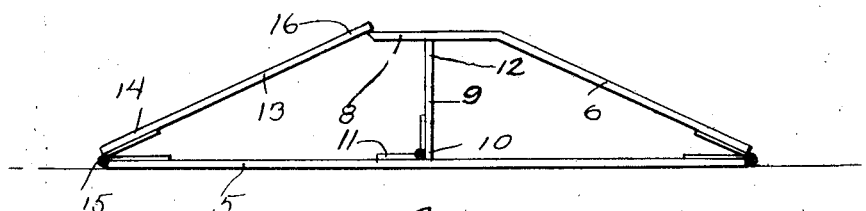
Figure 1 is a side elevation of an automobile frog constructed in accordance with an embodiment of the invention, and showing the frog in use.
Figure 2:
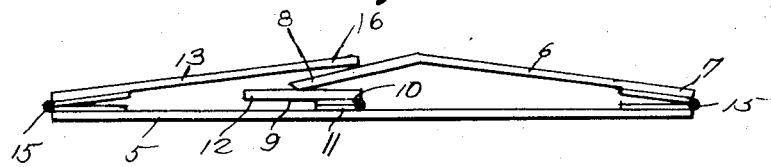
Figure 2 is a side elevation of the frog collapsed.
Figure 3:
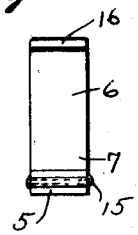
Figure 3 is an end elevation of the structure shown in Figure 1.
Figure 4:
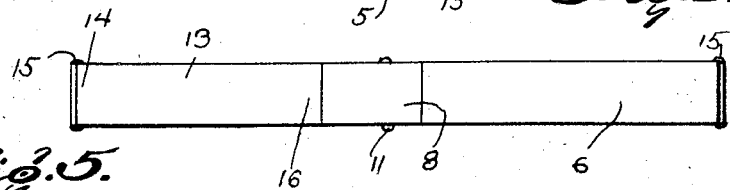
Figure 4 is a top plan view.
Figure 5:
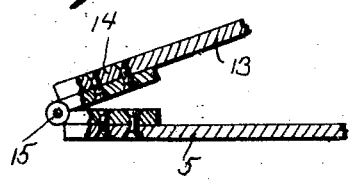
Figure 5 is a fragmentary and sectional view of one of the hinge connections.

Referring to the drawings, 5 designates a base member consisting of a strip of material of a width sufficient to support an automobile wheel. A supporting member 6 is provided, the end 7 of said member being hinged or otherwise movably connected to one end of the base member 5. The opposite end portion 8 is extended in angular relation to the body portion of the supporting member, and is adapted at certain times to be disposed in spaced parallel relation to the base member 5. In view of the hinge connection of the supporting 6 to the base member, it is possible for the supporting member to be swung toward and away from the base member so that the frog may be readily collapsed and stored in a small space.

In order to hold the supporting member 6 in its raised position, that is with the end portion 8 in spaced parallel relation to the base member, there is provided a novel prop, consisting of a standard 9 having its end portion 10 connected to the intermediate portion of the base member 5 by means of a hinge 11, and arranged to swing away from the hinge connection of the supporting member 6 to the base member. When the standard 9 is disposed in a vertical position, the extremity of the end 10 is adapted to engage the base member, while the opposite end 12 is adapted to engage the lower surface of the end portion 8 to provide a table for the reception of the wheel of an automobile or vehicle. By positioning the standard 9 so that it swings away from the hinge connection of the supporting member 6 to the base, said hinge connection and the hinge 11 cooperate to prevent collapsing of the device, as any movement on the table previously described tending to swing the standard 9 away from the supporting member 7, will be resisted by the hinge connection of the supporting member 6 to the base 5, and any movement which would tend to urge the supporting member 6 toward the base will be resisted by contact of the end portion 10 of the standard with the base and the hinge 11.

A bracing and supporting member 13 is provided, the end 14 of said member being connected to the opposite end of the base member by means of a hinge 15, the opposite end 16 of the brace member being arranged to extend over the end of the supporting member 6 and to rest thereupon. If desired, this member as well as the body portion of the supporting member 6 may be used to direct the wheel of an automobile to the table of the frog, and similar to the supporting member 6, and the standard 9, is arranged to move toward the base 5 when the standard 9 is disengaged from the table or end portion 8.

In use, the parts of the frog are extended as shown in Figure 1, and the frog placed in front of the automobile wheel to be raised. The automobile is then driven slowly forward under its own power so as to cause the wheel to gradually ride upon the body portion of the supporting member 6, until the vertical center of the wheel is positioned directly over the standard 9. The brake is then applied so as to hold the automobile in position. A jack or other elevating means may be positioned under the axle to hold the same in its raised position without the necessity of requiring the jack to be raised step by step to elevate the axle. After the jack is applied, the standard 9 is moved away from the supporting member 6 by striking the same so as to permit the table or end portion 9 to become disengaged from the wheel. When the standard 9 swings downwardly into engagement with the base member 5, the supporting member 6 likewise swings toward the base member, and the bracing member 13 toward the base member 5 and upon the end portion 8 of the supporting member 6. The device is thereby rendered compact, may be readily removed from the vehicle, and stored in a small space.

Another important feature of the device is that its use is not limited to automobiles or like vehicles, as it may be constructed of heavier material and used as a frog for railway cars, the operation being the same as that for raising the wheels of an automobile. I, therefore, do not desire to be limited to the precise arrangement of the device, as changes may be made to accommodate the device for various purposes without departing from the spirit of the invention.

From the foregoing it will be readily seen that this invention provides a novel form of automobile frog which eliminates physical strain on the part of the operator when it is desired to raise the wheel for repairs, by using the power of the automobile to raise itself through the medium of the frog so as to permit the application of a jack in the usual manner. In this way, the heaviest type of car made, may be elevated for repairs by a person having very little strength, without requiring unnecessary physical strain.

What is claimed is:

1. A device of the character described comprising a base, supporting members movably connected to the base, said members being arranged to engage each other, and means for supporting the engaged portions of said members in spaced relation to the base.

2. A device of the character described comprising a base, supporting members movably connected to the base, and arranged to swing toward and away from the base, one of said supporting members being arranged to support another of said supporting members, and means for supporting the last mentioned supporting member in spaced relation to the base.

3. An automobile frog comprising a base member, a supporting member movably connected at one end to one end of the base, a second supporting member movably connected at one end to the opposite end of the base, and arranged to engage the opposite end of the first mentioned supporting member, and means movably connected to the base for supporting the last mentioned end of the first mentioned supporting member in spaced relation to the base.

4. A device of the character described comprising a base, supporting members movably connected at their outer ends to the ends of the base, the inner end of one of said supporting members being adapted to support the inner end of another of said supporting members, a standard movably connected to the intermediate portion of the base and adapted to support the inner end of one of said supporting members.

5. A device of the character described comprising a base, supporting members movably connected at their outer ends to the ends of the base, the inner end of one of said supporting members being adapted to support the inner end of another of said supporting members, a standard movably connected to the intermediate portion of the base and adapted to support the inner end of one of said supporting members, said standard being frictionally engaged with the last mentioned supporting member, whereby the standard may be swung toward the base to permit movement of the supporting members toward the base.

In testimony whereof I hereunto affix my signature.

THORVALD F. CHRISTENSEN.